G. STEVENSON.
Hog-Ringers.

No. 148,256. Patented March 3, 1874.

WITNESSES.
P. C. Dieterich
Harry C. Scott

INVENTOR
George Stevenson per
C. H. Watson & Co
ATTORNEYS.

UNITED STATES PATENT OFFICE.

GEORGE STEVENSON, OF ZIONSVILLE, INDIANA.

IMPROVEMENT IN HOG-RINGERS.

Specification forming part of Letters Patent No. 148,256, dated March 3, 1874; application filed January 3, 1874.

*To all whom it may concern:*

Be it known that I, GEORGE STEVENSON, of Zionsville, in the county of Boone and State of Indiana, have invented certain new and useful Improvements in Hog-Ringers; and I do hereby declare that the following is a full, clear, and exact description thereof, reference being had to the accompanying drawings and to the letters of reference marked thereon, which form a part of this specification.

My invention relates to that class of hog-ringers, or devices for snouting hogs, in which a spear-shaped barb or dart is used to be passed through the rooter of the hog; and the nature of my invention consists in the construction and arrangement of such device or forceps; also, in the construction of certain attachments to the forceps whereby the instrument may be used for cutting loose a part of the rooter or snout, as will be hereinafter more fully set forth.

In order to enable others skilled in the art to which my invention appertains to make and use the same, I will now proceed to describe its construction and operation, referring to the annexed drawing, in which—

Figure 1:
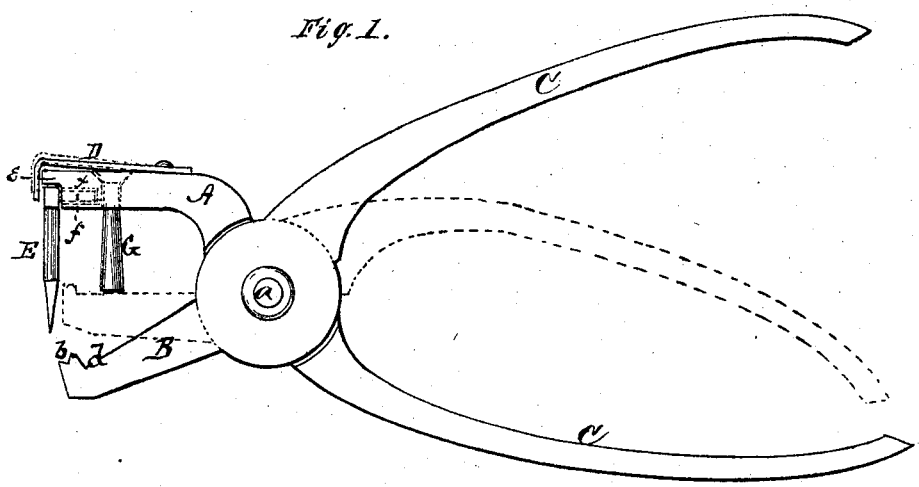
Figure 3:
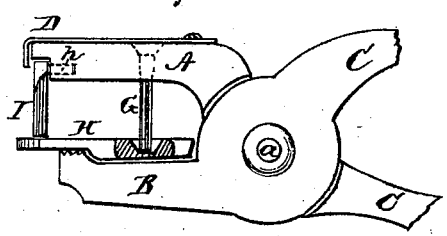
Figure 2:
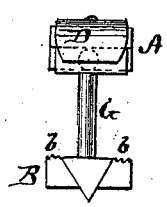
Figure 4:
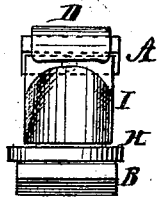

Figure 1 is a side view of my forceps. Fig. 2 is a front view of the same. Fig. 3 is a side view, and Fig. 4 a front view, of the forceps, with the attachments in place thereon.

A represents the upper, and B the lower, jaw of my forceps, pivoted together in the usual manner at $a$, and provided with handles C C. The lower jaw B is perfectly square at the end, and is of such length relative to the upper jaw that the spear-point of the barb will pass directly by or close to its square end when it is driven through the snout of the hog. This short square-ended lower jaw is corrugated or toothed on its upper side near the end, as shown at $b$, and has a transverse shoulder, $d$, also in its upper surface, immediately inside of the teeth $b$. This is for the purpose of receiving and holding up the snout of the hog while the spear is driven through. The upper jaw A is formed with a shoulder, $e$, at its end, against which the upper end of the spear E is placed, the spear at this end being provided with a pin, $f$, which extends at right angles with the spear, and is inserted in a tapering hole, $x$, made longitudinally in the jaw from the outer end inward. On top of the upper jaw A is secured a spring, D, and the outer end of this spring is bent square over the end of the jaw, and comes over the head of the spear, holding the same in its proper place until it is passed through the rooter of the hog. From the upper side downward through the upper jaw A is passed a headed pin, G, and the spring D passes over the head thereof. As the cutting end of the spear E passes through the flesh of the rooter of the hog, the end of the pin G comes in contact with the lower jaw B, and raises the spring D as the handles come together far enough for the bent end of the spring to clear the head of the spear, which allows the spear to be withdrawn from the forceps, or the forceps from the spear, leaving the spear in the snout of the hog. H represents a wooden lip attached to the upper surface of the lower jaw B by means of one or more screws, and extending a short distance beyond the end of the jaw. In the upper jaw is then placed a curved knife, I, provided with a pin, $h$, to be inserted in the hole $x$, and the knife held by the end of the spring D.

By these attachments the instrument may be used to cut loose a part of the rooter or snout, leaving it fast at each side of the nose to form a roller of flesh to prevent the hog from rooting. This is often done, but has heretofore required a separate instrument. By my invention the same instrument may be used for both purposes.

Having thus fully described my invention, what I claim as new, and desire to secure by Letters Patent, is—

1. The square-ended lower jaw B, provided with teeth $b$ and shoulder $d$, and constructed substantially as and for the purpose specified.

2. The spring D, attached to the upper jaw

A, and having its end bent over the end of the jaw, substantially as and for the purposes herein set forth.

3. The loose pin G, passing through the upper jaw A, and operating in combination with the jaws A B and spring D, substantially as and for the purposes herein set forth.

4. In combination with the forceps A B C and spring D, the wooden lip H and the curved knife I, provided with the pin h, substantially as and for the purposes herein set forth.

In testimony that I claim the foregoing as my own I affix my signature in presence of two witnesses.

GEORGE STEVENSON.

Witnesses:
S. N. HARDEN,
JOHN J. PURCELL.